Figure 1:
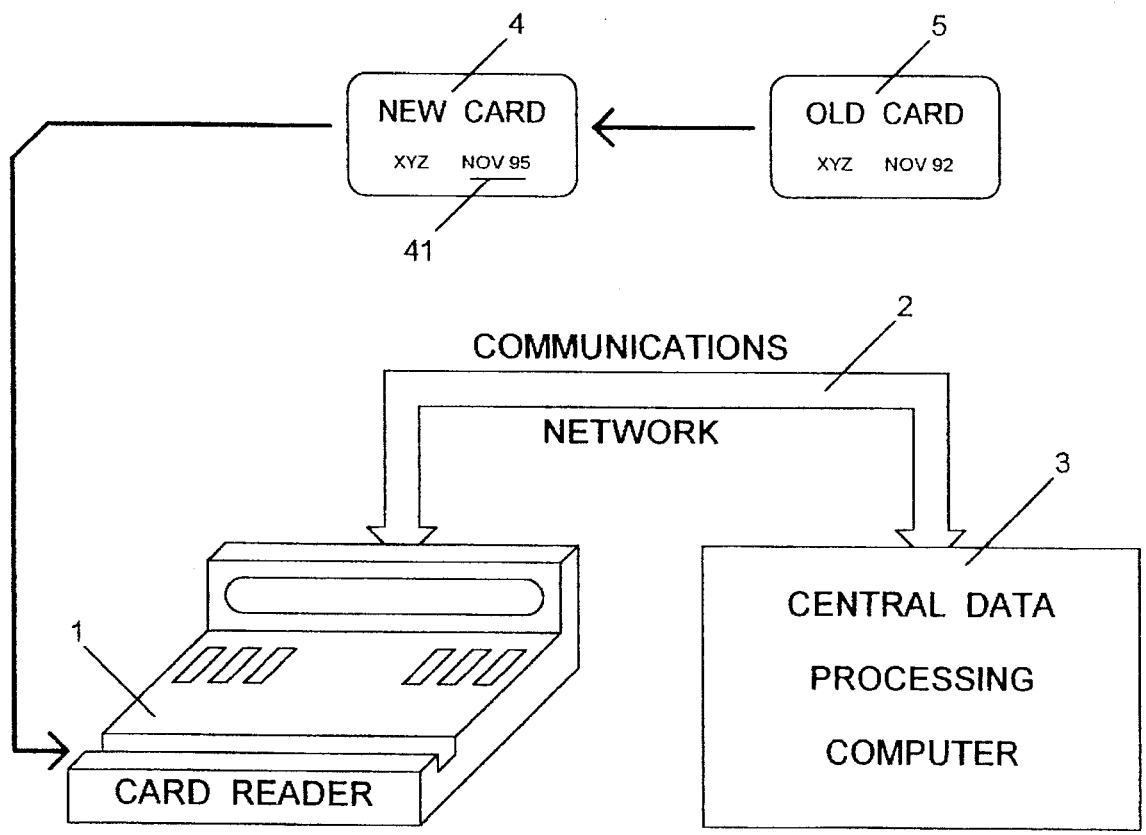

United States Patent [19]

Seiler

[11] Patent Number: 5,648,647
[45] Date of Patent: Jul. 15, 1997

[54] ANTI-FRAUD CREDIT CARD DISPATCH SYSTEM

[76] Inventor: Dieter G. Seiler, P.O. Box 353, Stn. Main, Carleton Place, Canada, K7C 3P4

[21] Appl. No.: 464,738

[22] PCT Filed: Dec. 24, 1993

[86] PCT No.: PCT/CA93/00560

§ 371 Date: Jun. 22, 1995

§ 102(e) Date: Jun. 22, 1995

[87] PCT Pub. No.: WO94/16415

PCT Pub. Date: Jul. 21, 1994

Related U.S. Application Data

[63] Continuation-in-part of Ser. No. 999,121, Dec. 31, 1992, abandoned.

[51] Int. Cl.⁶ .............................. G06K 5/00; G06F 17/60
[52] U.S. Cl. ................................ 235/380; 235/379
[58] Field of Search ....................... 235/380, 379, 235/382, 492, 375; 340/825.31, 825.35; 364/401

[56] References Cited

U.S. PATENT DOCUMENTS 5,162,638  11/1992  Diehl et al. .................. 235/380

FOREIGN PATENT DOCUMENTS 2-39392  2/1990  Japan .................. G07F 7/08
6-20106  1/1994  Japan .

Primary Examiner—Donald T. Hajec
Assistant Examiner—Thien Minh Le
Attorney, Agent, or Firm—Robert A. Wilkes

[57] ABSTRACT

An anti-fraud system for the dispatch of credit cards to customers, rendering the new card useless to anyone other than the intended customer. Validation of the new card is accomplished at any retail outlet by means of a timed sequence at the transaction processing computer which ensures that any first-time sales authorization request under the new card is followed immediately within a prescribed time interval by a reading of the old credit card number and expiry date. The system also operates if the old card is tendered first at a sales outlet after the new card has been issued. This unique sequence of events will then automatically invalidate the old card, validate the new card, and indicate to the card issuing company that the customer has acknowledged receipt of their new card. Since both the old, expiring card, and the new card are required in order to validate the new card, an unauthorized party in illegal possession of the new card only, cannot use it.

20 Claims, 3 Drawing Sheets

BEFORE RENEWAL CARD ISSUED

| CARD NUMBER | OLD DATE | NEW DATE | TIMESTAMP DAY:HR:MIN | NEW FLAG |
|---|---|---|---|---|
| XYZ | NOV 92 | NOV 92 | 000:00:00 | 0 |
| 61 | 71 | 81 | 91 | 101 |

FIGURE 2

AFTER RENEWAL CARD ISSUED

| CARD NUMBER | OLD DATE | NEW DATE | TIMESTAMP DAY:HR:MIN | NEW FLAG |
|---|---|---|---|---|
| XYZ | NOV 92 | NOV 95 | 000:00:00 | 0 |
| 62 | 72 | 82 | 92 | 102 |

FIGURE 3

AFTER FIRST USE OF RENEWAL CARD

| CARD NUMBER | OLD DATE | NEW DATE | TIMESTAMP DAY:HR:MIN | NEW FLAG |
|---|---|---|---|---|
| XYZ | NOV 92 | NOV 95 | 332:17:56 | 1 |
| 63 | 73 | 83 | 93 | 103 |

FIGURE 4

AFTER RENEWAL CARD VALIDATED

| CARD NUMBER | OLD DATE | NEW DATE | TIMESTAMP DAY:HR:MIN | NEW FLAG |
|---|---|---|---|---|
| XYZ | NOV 95 | NOV 95 | 000:00:00 | 0 |
| 64 | 74 | 84 | 94 | 104 |

FIGURE 5

ANTI-FRAUD CREDIT CARD DISPATCH SYSTEM

This application is a continuation-in-part of application Ser. No. 07/999,121, filed Dec. 31,1992, now abandoned.

This invention relates to the process of validating renewal credit cards dispatched from a company issuing credit cards to its customers in such a manner that fraudulent use of a renewal credit card through theft or customer abuse is reduced.

An increasing area of concern for credit card-issuing companies today is the fraudulent use of credit cards in situations where the issuing company is liable for all losses. This type of situation exists whenever renewal credit cards are sent to the customer, since the issuing company maintains liability for the credit cards until it can be proven that the intended customer has safely received the credit card. The type of theft and fraudulent usage occurring in these circumstances can be summarized in three general categories, namely; postal system theft, third party wrong address or mailbox theft, and customer fraud. Dispatching renewal credit cards by registered mail has been used in the past to try and guarantee receipt of the credit card by the intended customer. However, this method has become extremely expensive, poses a slight inconvenience to customers, does not prevent theft from within the postal system, and in fact does not guarantee that the credit card is delivered to the intended addressee, that is, the customer.

Rudolph in U.S. Pat. No. 3,683,806 describes a theft-proof credit card assembly consisting of two halves which are mailed separately over the course of several days to the customer, who then reassembles the halves to produce a valid credit card. This method has the disadvantages of doubling the postage costs, requiring consistent foolproof assembly by various credit card holders, and not eliminating totally the risk of theft either at the mailbox or at an old former, or otherwise incorrect, address.

U.S. Pat. Nos. 4,947,027 and 5,061,844 both describe secure credit card systems which involve the design and distribution of a new type of credit card and the use of a secret code which must be obtained from the customer. Implementation of an efficient system to obtain and record secret codes from customers is an expensive process, in addition to the extra cost of a new credit card design.

The use of an effective start date, as well as an expiry date, on a credit card has also been implemented to shorten the time period within which an issued credit card can be abused. However, this method requires expensive and timely follow-up communications with the customer to verify receipt of the issued credit card. This technique does not solve the problem of mailing credit cards to old or otherwise incorrect addresses, and has little material effect on postal system theft.

The general public knowledge of these types of problems, and poor economic conditions, have given rise to a type of fraudulent activity more difficult to deal with, wherein the card holder receives the renewal credit card, abuses it by using it with an alternate signature style, and then claims never to have received it. In a variation of this form of abuse, the card holder allows a friend or close relative to use the credit card, with a wholly fraudulent signature.

This invention seeks to curtail the potential for an individual to commit the aforementioned types of fraud with renewal credit cards. According to this invention, a credit card is sent by mail, for example from the issuing bank, to the customer. Being a renewal credit card, there exists at least one piece of information on the credit card which differs from the old credit card, which is most likely to be the expiry date, but other indicia may also be used. Upon sending the credit card, the issuing agency, for example a bank, records the new expiry date and/or other pertinent indicia for the renewal credit card in a computer memory file linked with the customer's credit card number and name. Upon receiving the renewal credit card, the customer signs the renewal credit card, but does not destroy the old credit card. At the customer's convenience, the next time a credit card purchase is made, the customer first hands over the recently received renewal credit card for processing. The computer then retrieves all of the credit card information, either via a standard credit card reader machine, or by telephone between the vendor and the transaction processing clerk. The computer recognizes that this is an attempt to use the renewal credit card and initiates a short timed interval, conveniently about three minutes, for example, called the transfer duration threshold time. At the same time, the computer sends a message back to the vendor, either via the credit card reader display or by means of a transaction processing clerk, which stipulates that the old credit card information must now be processed in order for the transaction to be authorized and completed. The computer then proceeds with the processing of other transaction requests. If the computer receives the old credit card information within the specified short time interval, then the renewal credit card is automatically validated and approved for immediate use. At the same time, the old credit card is invalidated in the computer memory. The transaction at the vendor's store is then processed as usual, dependent on the status of the customer's account. If the old credit card information is not received by the computer within the specified short time interval following use of the renewal credit card, the renewal credit card will not be validated and authorization is not given for that particular transaction. Should the credit card holder fail to validate their renewal card on their first attempt, the system will allow multiple attempts until validation is successfully completed. Only with both the old credit card and the renewal credit card can successful validation eventually be achieved.

This renewal credit card validation system will work equally well if the sequence is reversed, and the old credit card is presented first. The computer will again recognize that a renewal credit card has been issued, and will call for presentation of the renewal credit card within the prescribed transfer duration threshold time. Thereafter, the transaction again is completed in the usual way, and the old credit card invalidated in the computer memory. This system will also work, but is less secure, if identification of the location where credit cards are tendered, that is the transaction source location code, is used rather than a time interval. Alternatively, both a time interval and the transaction source location code can advantageously be used together.

This invention has the primary advantage of making far more difficult the fraudulent use of renewal credit cards without changing in any manner either the credit cards, the currently used electronic readers, or the general procedure of making purchases. The method is also totally compatible with the older verbal authorization process via telephone. Since the old credit card is immediately rendered useless upon using it to validate the renewal credit card, the problem of multiple valid credit cards in existence at the same time is also eliminated. This system is also convenient for the credit card customer since the renewal credit card validation process may take place at any time after receipt of the credit card, and at any sales outlet which accepts that particular credit card. Indeed, this system gives the option of allowing an old credit card to be used to validate a renewal credit card even after the expiry date on the old credit card has elapsed. This method of credit card validation may also be usefully interpreted as acceptance verification by the intended card holder to whom the renewal credit card was dispatched. It has the significant advantage that a fraudulent user is highly unlikely to be in possession of both the old and the renewal credit cards, and thus cannot readily validate the renewal credit card in order to abuse it.

In the following description, the invention will be described primarily in the context of the commonest form of credit card, that is those issued by banks and similar institutions. The invention however is not limited to this particular species of credit card, and can be applied to almost any of the credit cards now commonly in use. Thus in addition to bank credit cards, it includes debit cards, credit cards issued by stores and other product retailers, trust companies offering credit services, and other credit agencies.

In a first embodiment this invention seeks to provide a method for validating a renewal credit card issued to replace an old credit card, both of which credit cards are in the possession of the credit card holder, wherein each credit card bears information identifying the credit card holder, and information distinguishing the renewal credit card from the old credit card, which method comprises the following steps:

(i) tendering, by the credit card holder, the first of the two credit cards to a transaction recipient authorized to accept transactions made involving the credit card and having a transaction source location code;

(ii) transferring from the transaction recipient to a computer memory at least some of the information recorded on the first credit card, including at least some of the distinguishing information;

(iii) comparing within the computer the transferred information with the information on record concerning the first credit card, and determining that a computer record for the second credit card exists bearing the same information identifying the credit card holder;

(iv) transferring to the transaction recipient a request for the credit card holder to tender to the transaction recipient the second credit card;

(v) tendering the second credit card to the transaction recipient;

(vi) transferring from the transaction recipient to the computer memory at least some of the information recorded on the second tendered credit card, including at least some of the distinguishing information;

(vii) comparing within the computer the transferred information derived from the second tendered credit card with the information on record, including that the transferred information derived from the second tendered credit card correlates with the information on record for the second credit card, including correct information distinguishing the second credit card tendered in step (v) from the credit card first tendered in step (i);

(viii) determining in the computer that the information transferred in each of steps (ii) and (vi) also jointly satisfies a further security criterion, chosen from at least one member of the group consisting of:

(a) that the sequence of steps starting from step (iv) through the completion of step (vi) collectively take place within a predetermined time period; and (b) that the information transfers in both step (ii) and step (vi) originate from the same transaction recipient, and include the same transaction source location code; and (ix) validating the tendered renewal credit card for further subsequent use, and invalidating the old credit card against any further use, by revising the computer memory records to accept only the renewal credit card having its distinguishing information.

In this procedure, either the old credit card, or the renewal credit card, may be tendered as the first credit card, in step (i). The other of the two credit cards is then tendered as the second credit card in step (v).

Preferably, the method includes in a further step (x) transferring to the transaction recipient a message indicating that the renewal credit card has been validated.

Preferably, the information is transferred in steps (ii) and (vi) by means of a credit card reader, and the indicia carried by the credit cards includes at least some machine readable information. Alternatively, the information is transferred by verbal means, and the indicia include at least some visually readable information.

Preferably, the security criterion chosen for step (viii) is option (a), that is, that the second credit card is processed within a specified time period, starting with the request in step (iv) to tender the second credit card. The most secure method is to choose both of options (a) and (b), that is, that the information has to come from the same source and within the specified time period.

One important element in this method of validating a credit card is the transaction recipient, since the transaction recipient is involved in the validation procedure. In many cases, the transaction recipient will be a person, such as a sales clerk (handling any form of sale, lease or rental transaction) or a bank official such as a teller. Alternatively, the transaction recipient may be a banking machine from which the credit card holder can withdraw money. When the transaction recipient is a machine of some nature, the request for the other credit card called for in step (iv) is made by displaying a suitable message on the machine viewing screen. If the correct second credit card is tendered to the machine within the preset time period the transaction is completed in the usual way, and the renewal credit card validated. If the correct credit card is not presented, then the transaction is terminated, and the renewal credit card is not validated.

Figure 6:
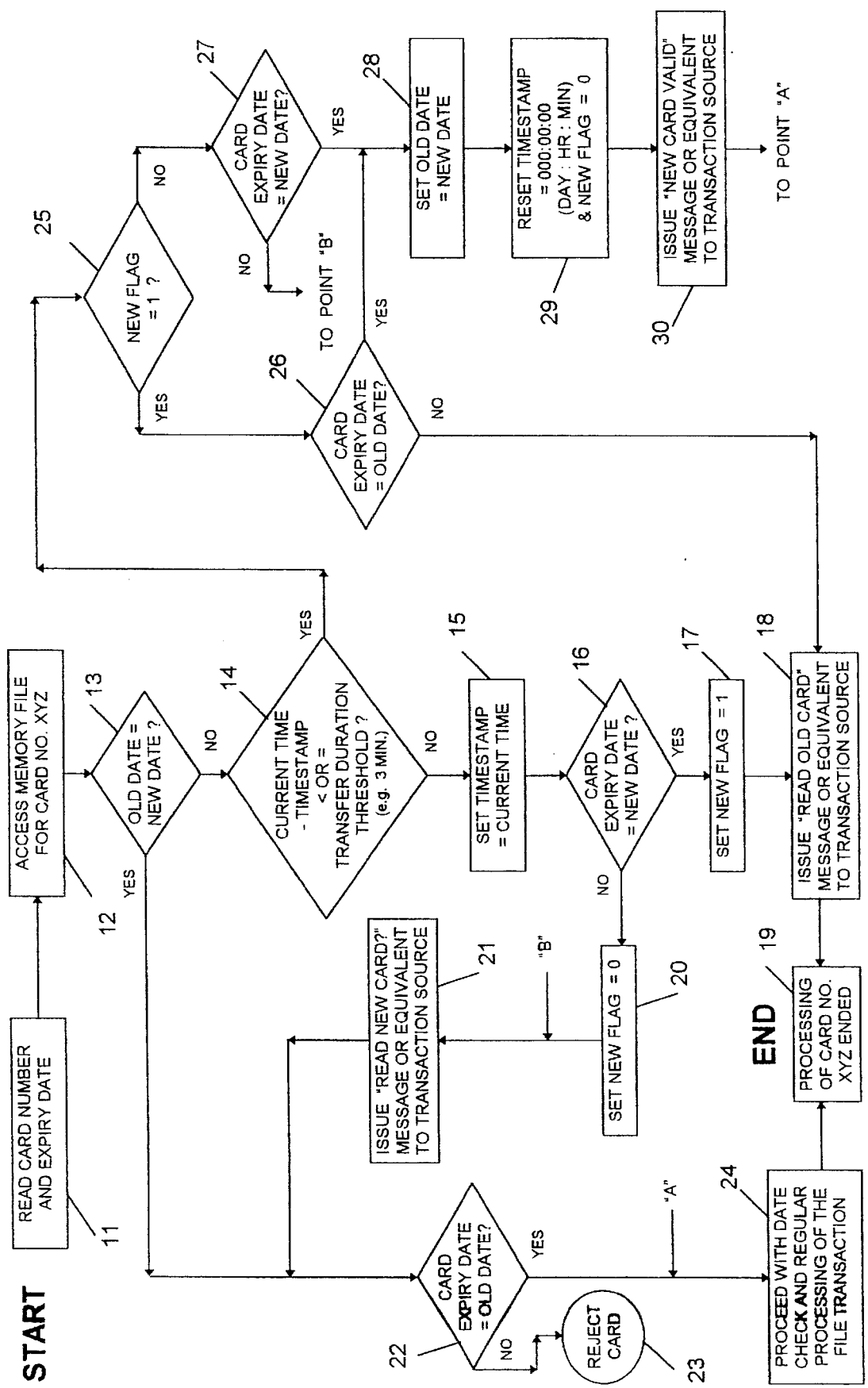

The invention will now be discussed by way of reference to the attached Figures, in which:

FIG. 1 illustrates the renewal credit card validation process by means of a credit card reader;

FIGS. 2, 3, 4, and 5 illustrate a representative section of part of the data processing computer's memory contents for one credit card file, shown at various stages throughout the validation process; and FIG. 6 is a flow chart illustrating the computer's renewal credit card validation process.

Referring first to FIGS. 1, and 2 through 5, a credit card company or banking institution issues a renewal credit card 4 (FIG. 1) to a customer with representative credit card number XYZ. The renewal credit card 4 has a new expiry date 41 for example, November 1995, which along with the customer's name and credit card number is embossed in readable form onto the credit card and stored in digital form on the credit card's magnetic stripe. Other indicia, such as a change in a subsidiary code to the credit card number, can also be changed, either instead of, or in addition to, information on a new expiry date. For clarity, reference will be made below only to expiry dates. Prior to the actual dispatch of the renewal credit card to the card holder, the data processing con, puller memory is as shown in FIG. 2. Each of the registers for CARD NUMBER, 61, OLD DATE, 71, NEW DATE, 81, TIMESTAMP, 91, and NEW FLAG, 101, are as shown. The TIMESTAMP register 91 forming part of the customer file memory content is usually in a reset mode of zero days, zero hours, and zero minutes. This register 91 is used to record the time of day that either a renewal credit card 4, or an old credit card 5, is used as the first credit card to initiate a sales transaction and validation sequence after a renewal credit card has been dispatched but not yet validated, as will be discussed further, below. The memory also contains a NEW FLAG register 101 which is used to indicate that the first credit card which was processed for a pending validation sequence was the renewal credit card 4. The file memory contents for the credit card numbered XYZ will generally include other information such as the customer's name, address and account status, which are not shown as they are largely not relevant to the invention. However, the partial content shown in FIG. 2, and the similarly numbered parts shown in FIGS. 3,4, and 5, are sufficient to illustrate the embodiment of this invention.

As soon as the renewal credit card is sent to the customer, the issuing company ensures that the data processing computer 3 stores the credit card's new expiry date into the NEW DATE register 82 (FIG. 3). The OLD DATE register 72 still contains the old credit card expiry date which for the illustrated example is November 1992. The TIMESTAMP register 92 and the NEW FLAG register 102 are still set at zero.

The customer then wishes to make a purchase in a store supplied with a credit card reader 1, which is typically linked to a central data processing computer 3 by means of a communications network 2 (FIG. 1). The flow chart in FIG. 6 includes two possibilities: that a renewal credit card does not exist, and that a renewal credit card does exist, and is in the possession of the credit card holder. In both cases, the sequence is initiated by the customer handing over a credit card, which the vendor passes through the credit card reader 1. The encoded credit card number XYZ and expiry date are among the information extracted from the magnetic stripe on the credit card and transmitted over the communications network 2 to the data processing computer 3.

If no renewal credit card has been issued, and the old credit card 5 is tendered, the data processing computer 3 receives and stores the credit card number with expiry date in process step 11, and uses the credit card number XYZ to look up the memory contents for the corresponding customer file in process step 12. The OLD DATE register 71 for credit card number XYZ in register 61 is then compared in process step 13 to the NEW DATE register 81 in the same file to check if they are equal (FIG. 2). "Equal dates", that is the two expiry dates in the registers 71 and 81 are the same, signify the normal condition of a validated credit card requesting access, and processing therefore continues with the old credit card expiry date confirmation in process step 22, date check for expired credit cards, and transaction calculations in process step 24.

If a renewal credit card 4 has been issued, and is tendered, as in the current example, the data processing computer will look up the memory contents for the customer file corresponding to credit card number XYZ in register 62. The OLD DATE register 72 is then compared in process step 13 to the NEW DATE register 82 (FIG. 3). The computer will recognize that the dates in the registers 72 and 82 are unequal. "Unequal dates", that is the expiry dates in the registers 72 and 82 are different, imply that a renewal credit card 4 has already been sent to the customer, but that the renewal credit card has not yet been validated for use. At this stage 14, a reference current time is generated, and a time difference is calculated between the reference current time and the time contained in the TIMESTAMP register 92 (FIG. 3). The time difference is then compared to a fixed transfer duration threshold value which represents the longest time duration allowed between processing of the two consecutive required credit cards by the data processing computer in any order, the renewal credit card 4 and the old credit card 5, for the purpose of renewal credit card validation. This will ordinarily be a short time period, generally less than ten minutes. Assuming a transfer duration threshold of three minutes, the time difference comparison for the given example is found not to be less than or equal to the three-minute limit since the TIMESTAMP register 92 contains zero initially. The TIMESTAMP register 93 is then preset to the current day and time in process step 15; for the given example register 93 shows 5:56 p.m. on day 332, that is November 28th. The credit card expiry date as read by the data processing computer 3 is then compared in process step 16 with the contents of the NEW DATE register 83, which contains the renewal credit card expiry date, November 1995. Since the renewal credit card 4 has been read, the expiry date comparison is affirmative and the NEW FLAG register 103 is then preset in process step 17 to a value of one to indicate that the first credit card read was a renewal credit card 4. At this point the memory contents for the customer file corresponding to credit card number XYZ in register 63 are as shown in FIG. 4. A "READ OLD CARD" or equivalent message in process step 18 is then sent to the credit card reader 1 electronic display, after which the processing of the customer file for credit card number XYZ is terminated in process step 19.

The vendor, upon reading the "READ OLD CARD" message, requests the old credit card 5 from the customer, and promptly passes it through the credit card reader 1, followed by entry of the purchase transaction details as usual. The data processing computer 3 reads the credit card number with expiry date in process step 11 and accesses the customer file for credit card number XYZ once again in process step 12. Since the contents of the two expiry date registers 73 and 83 still differ in process step 13, processing continues with the time difference versus transfer duration comparison in process step 14. Since the old credit card 5 was processed promptly after processing of the renewal credit card 4 within the required time period, the difference between the reference current time and that recorded in the TIMESTAMP register 93 is less than the allowed three-minute transfer duration threshold. The NEW FLAG register 103 is therefore tested next in process step 25 to determine which credit card was used first in the current validation process. Since the register has been set equal to one and has not been altered, as shown at 103 (FIG. 4), the NEW FLAG test is affirmative, indicating the renewal credit card was used first. The credit card expiry date as read by the computer is then compared with the contents of the OLD DATE register 73 in process step 26 to verify that the credit card is indeed the old one as required. If the comparison result is negative, then the renewal credit card 4 has been erroneously input again, and the "READ OLD CARD" message in process step 18 is reissued followed by termination of the processing of customer file for credit card number XYZ in process step 19.

If the comparison result in step 26 (FIG. 6) is positive, this verifies that the old credit card 5 has been processed within the allowed three minutes after the processing of the renewal credit card 4. Validation of the renewal credit card 4 and coincident invalidation of the old credit card 5 is achieved at this stage 28 by resetting the contents of the memory 64 for credit card number XYZ (FIG. 5). The OLD DATE register 74 containing the old expiry date of November 1992 is reset equal to the contents of the NEW DATE register 84 which contains the new expiry date November 1995. The TIMESTAMP register 94 in process step 29 is then reset to zero, the NEW FLAG register 104 is reset to zero (FIG. 5), and a message is issued back to the credit card reader 1 electronic display such as "NEW CARD VALIDATED" in process step 30. Processing then proceeds from this point with the regular transaction calculations in process step 24.

In the preceding example, the validation process has been initiated by the processing of the renewal credit card 4 first. An initial processing of the old credit card 5 will also lead to renewal credit card validation on as shown by the following example.

The customer first hands over their old credit card 5 to the vendor when making a purchase, and system processing of the credit card data is identical to the "renewal credit card first" version up to process step 16. At this point the negative response indicates that the old credit card has been used first in the validation process, therefore in process step 20 the NEW FLAG register is cleared to zero. Next in process step 21 the message "READ NEW CARD?" is issued back to the credit card reader 1 electronic display. The question form of response is used here since the customer may not have received their renewal credit card yet and may simply be making a purchase with the old credit card 5. However, this display functions as a reminder to the customer that the renewal credit card 4 has already been dispatched to them. A credit card expiry date check in process step 22 is performed and the old credit card 5 is allowed access to the existing file processing calculations in step 24, where an expired credit card date is routinely checked for, and transaction details are entered into, the customer's file. In this case the customer is still allowed to make a credit card purchase on their old credit card 5, dependent on the customer's account status and provided that the credit card has not yet expired.

If the customer also has their renewal credit card 4, and the credit card is promptly passed through the credit card reader 1 in response to the "READ NEW CARD?" invitation after processing of the old credit card 5, then one arrives at process step 14 again for the time difference calculations. Since the former processing of the old credit card 5 set a timestamp similar to that at 93, and the renewal credit card 4 processing followed promptly, the current time minus the timestamp value will be less than the allowed three minutes for the transfer duration threshold. The affirmative response leads to process step 25 where the NEW FLAG register is tested. Since the NEW FLAG register was cleared to zero during the previous processing of the old credit card 5, an advance to process step 27 is the result of the NEW FLAG register test. In process step 27 the input credit card is checked to see if it is the required renewal credit card 4, and if not, then the "READ NEW CARD?" message is reissued in step 21, followed by subsequent old credit card 5 processing, if required, in process steps 22 and 24. If the required renewal credit card 4 is verified in process step 27, as in this example, then the renewal credit card validation procedure is performed in process steps 28, 29, and 30 as described earlier. After process step 30, the regular transaction calculations are made in process step 24, if required, for example, when using an expired old credit card to initiate the validation of a renewal credit card and making a purchase at the same time. Process steps 22 and 23 function to disallow purchase transaction authorization with an invalidated old credit card, even though that credit card has not yet reached its expiry date. Validation of the renewal credit card automatically precludes further use of the old credit card.

Although the electronic credit card reader version has been described, this invention works equally well with the older verbal authorization system by telephone conversation between a vendor and a transaction processing clerk. This method is also used when, for some reason, the electronic credit card reader fails to read the encoded credit card data properly even though the credit card is a genuine one. If a renewal credit card which has not yet been validated is proffered for the current transaction, the vendor is requested over the phone to ask the customer for their old credit card. The vendor must also see the old credit card, and read its credit card number and expiry date (or other identifying indicia) to the transaction processing clerk before credit card validation and subsequent transaction authorization may occur.

In the preceding description it is assumed that the credit card reader includes a visual display means. It is not uncommon for the credit card reader to form part of a cash register, in which case the issued messages in process steps 18, 21, and 30 (FIG. 6) utilise the readout means in the cash register. This may be an electronic display, or printed message similar to a sales slip. In either case, the credit card reader has associated with it a readout means whereby the required messages may be conveyed.

In a similar fashion, the validation process is also applicable to a transaction carried out through a banking machine. The procedure will be more or less the same as that described above, for either the old credit card being presented on its own, or together with the renewal credit card. The various needed instructions are provided to the credit card user by the visual display on the banking machine. It is also possible for the machine to retain, rather than simply invalidate, the old credit card when a renewal credit card is validated.

It should also be appreciated that: although the expiry date was specifically used as the item of difference between the old and renewal credit cards in the preceding description, any type and quantity of characters may be used to differentiate the renewal credit card from the old credit card. Generally, any differentiating characters will be alphanumeric, but other indicia can also be used. The differentiating characters do not necessarily have to be visually readable on the credit card surface, although at least some visually readable characters are required when verbal transaction authorization by telephone is used.

The unit of time in day of the year, hour of the day, and minute of the hour has been used for the TIMESTAMP, and minutes are used in the transaction duration threshold values described earlier, although any arbitrary unit of time may be used for this purpose, such as computer clock cycles, for example.

An alternate reference standard to that of time used in the described process is location. The timestamp would be replaced in this case by the transaction source location code for the first credit card read by the system, whether a renewal credit card or an old credit card. The second "activating" credit card when processed then generates a second transaction source location code reference. The two reference source codes, usually consisting of multi-digit alphanumeric characters, are then compared to each other and must be equal for renewal credit card validation to proceed. This implies that both a customer's renewal credit card and their old credit card must be used at the same vendor location in order for renewal credit card validation to occur. Although this method of validation using source location codes is not as secure as the timestamp method, particularly for single-vendor type credit cards, however, it does offer a reasonable level of security for multi-vendor credit cards. If sufficient storage facilities and adequate processing time is available in the credit card issuing company central data processing computer, then both the timestamp and source location reference modes may optionally be implemented together at the same time to provide an improvement in security level.

The invention process steps outlined in the flow chart of FIG. 6 are intended to illustrate the general scope of this invention, and the process steps and their sequence may be varied to suit the individual needs of the credit card issuing company. For example, the process could allow for a transaction dollar amount to be entered immediately after the renewal credit card has been passed through the credit card reader first, rather than after the old credit card is read, without changing the scope and intent of the invention. Although the various process steps have been described with reference to software resident in a data processing computer, the basic invention may also be readily implemented in firmware or hardware, either centrally located or at remote satellite processing centres.

The embodiments of the invention in which an exclusive property or privilege is claimed are defined as follows:

1. A method for validating a renewal credit card issued to replace an old credit card, both of which credit cards are in the possession of the credit card holder, wherein each credit card bears information identifying the credit card holder, and information distinguishing the renewal credit card from the old credit card, which method comprises the following steps:
   (i) tendering, by the credit card holder, the first, of the two, credit cards to a transaction recipient authorized to accept transactions made involving the credit card and having a transaction source location code;
   (ii) transferring from the transaction recipient to a computer memory at least some of the information recorded on the first credit card, including at least some of the distinguishing information;
   (iii) comparing within the computer the transferred information with the information on record concerning the first credit card, and determining that a computer record for the second credit card exists bearing the same information identifying the credit card holder;
   (iv) transferring to the transaction recipient a request for the credit card holder to tender to the transaction recipient the second credit card;
   (v) tendering the second credit card to the transaction recipient;
   (vi) transferring from the transaction recipient to the computer memory at transaction recipient;
   (vi) transferring from the transaction recipient to the computer memory at least some of the information recorded on the second tendered credit card, including at least some of the distinguishing information;
   (vii) comparing within the computer the transferred information derived from the second tendered credit card with the information on record, including that the transferred information derived from the second tendered credit card correlates with the information on record for the second credit card, including correct information distinguishing the second credit card tendered in step (v) from the credit card first tendered in step (i);
   (viii) determining in the computer that the information transferred in each of steps (ii) and (vi) also jointly satisfies a further security criterion, chosen from at least one member of the group consisting of:
      (a) that the sequence of steps starting from step (iv) through the completion of step (vi) collectively take place within a predetermined time period; and
      (b) that the information transfers in both step (ii) and step (vi) originate from the same transaction recipient, and include the same transaction source location code; and
   (ix) validating the tendered renewal credit card for further subsequent use, and invalidating the old credit card against any further use, by revising the computer memory records to accept only the renewal credit card having its distinguishing information.

2. A method according to claim 1 further including (x) transferring to the transaction recipient a message indicating that the renewal credit card has been validated.

3. A method according to claim 1 wherein the transaction recipient is a person.

4. A method according to claim 1 wherein the transaction recipient is a machine adapted to process a credit card of the type tendered.

5. A method according to claim 1 wherein the credit card tendered in step (i) is the renewal credit card;
   the second credit card determined to exist in step (iii) is the old credit card; and
   the credit card tendered in step (v) is the old credit card.

6. A method according to claim 1 wherein the credit card tendered in step (i) is the old credit card;
   the second credit card determined to exist in step (iii) is the renewal credit card; and
   the credit card tendered in step (v) is the renewal credit card.

7. A method according to claim 1 wherein the information is transferred in steps (ii), and (vi) by means of a credit card reader; and
   wherein the indicia carried by both of the credit cards tendered in steps (i) and (v) include at least some machine readable information.

8. A method according to claim 3 wherein the information is transferred in steps (ii) and (vi) at least in part by verbal means; and
   wherein the indicia carried by both of the credit cards tendered in steps (i) and (v) include at least some visually readable information.

9. A method according to claim 1 wherein the information is transferred in steps (ii), and (vi) by means of a credit card reader;
   wherein the indicia carried by both of the credit cards tendered in steps (i) and (v) include at least some machine readable information, and
   wherein the request in step (iv) is transferred by causing a readout means associated with the credit card reader to display the request.

10. A method according to claim 3 wherein the request in step (iv) is transferred at least in part by verbal means; and
    wherein the indicia carried by both of the credit cards tendered in steps (i) and (v) include at least some visually readable information.

11. A method according to claim 1 wherein the credit card is tendered in step (i) to facilitate a transaction, and the transaction information transfer and the credit card validation steps are combined into one operation.

12. A method according to claim 1 wherein the at least one chosen further criterion in step (viii) is (a).

13. A method according to claim 1 wherein the at least one chosen further criterion in step (viii) is (b).

14. A method according to claim 1 wherein the at east one chosen further criterion in step (viii) is both (a) and (b).

15. A method according to claim 1 wherein the indicia on the credit cards distinguishing the old credit card from the renewal credit card is alphanumeric information.

16. A method according to claim 15 wherein the alphanumeric information includes the expiry date.

17. A method according to claim 16 wherein the expiry date information includes the month and year of expiry.

18. A method according to claim 1 wherein the predetermined time period of step (viii) is less than 10 minutes.

19. A method according to claim 18 wherein the time period is 5 minutes.

20. A method according to claim 18 wherein the time period is 3 minutes.

* * * * *

UNITED STATES PATENT AND TRADEMARK OFFICE
CERTIFICATE OF CORRECTION

PATENT NO. : 5,648,647
DATED : July 15, 1997
INVENTOR(S) : Dieter G. Seiler

It is certified that error appears in the above-identified patent and that said Letters Patent is hereby corrected as shown below:

Column 5, line 3, delete "con, puller" and insert --computer--,

Column 5, line 13, delete "beIow" and insert --below--,

Column 7, line 18, delete "on",

Column 9, delete lines 53 and 54.

Signed and Sealed this

Seventeenth Day of February, 1998

Attest:

BRUCE LEHMAN

*Attesting Officer*     *Commissioner of Patents and Trademarks*